Sept. 21, 1943.　　　　J. L. BREESE　　　　2,329,820
SELF-ADJUSTING THREE-STAGE CONTROL
Filed Sept. 18, 1941　　　3 Sheets-Sheet 1

Inventor
James L. Breese
by Parker Plouts
Attorneys

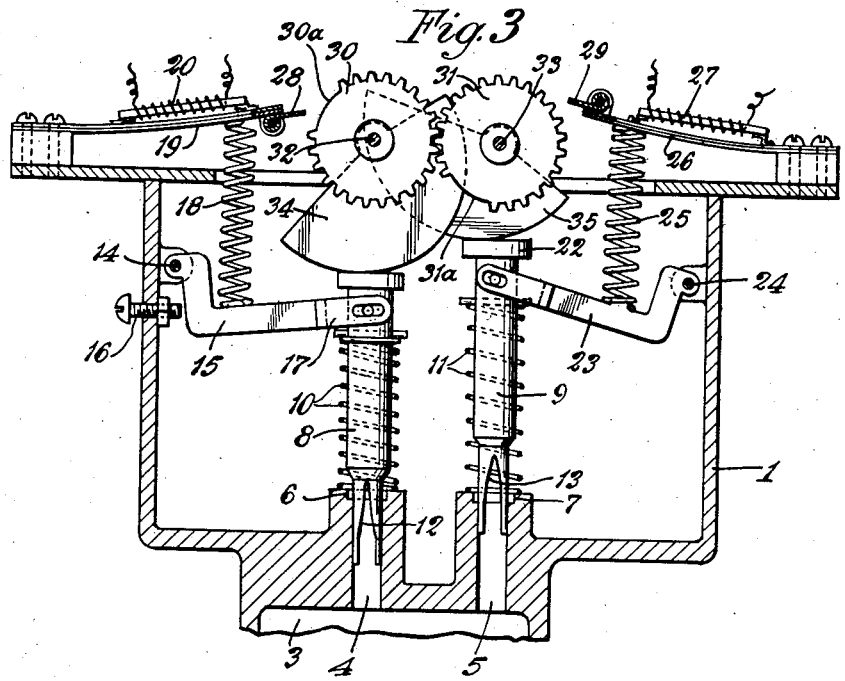
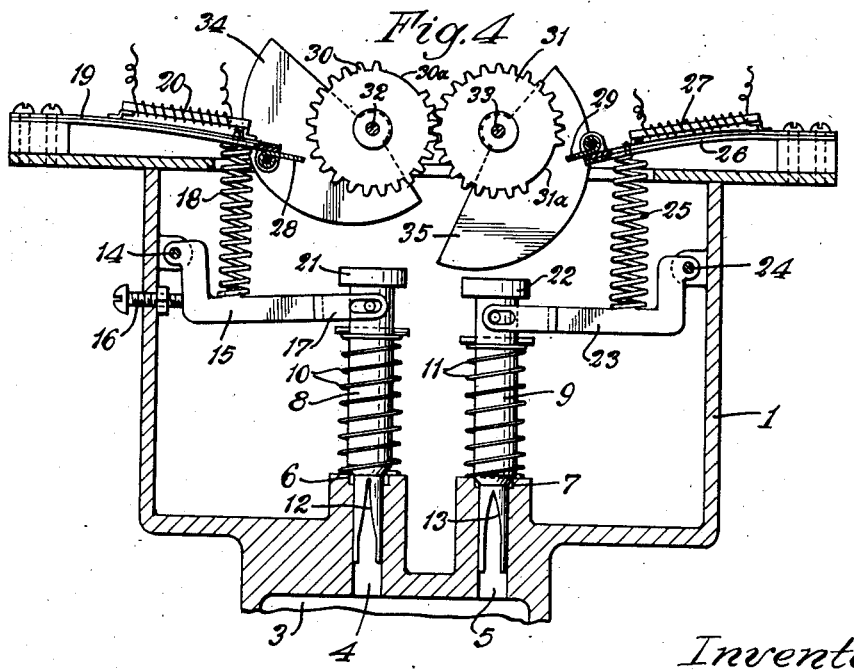

Sept. 21, 1943.   J. L. BREESE   2,329,820
SELF-ADJUSTING THREE-STAGE CONTROL
Filed Sept. 18, 1941   3 Sheets-Sheet 3

Inventor
James L. Breese
by Parker + Carter
Attorneys.

Patented Sept. 21, 1943

2,329,820

UNITED STATES PATENT OFFICE 2,329,820

SELF-ADJUSTING THREE-STAGE CONTROL

James L. Breese, Santa Fe, N. Mex., assignor to Oil Devices, Santa Fe, N. Mex., a limited partnership of Illinois Application September 18, 1941, Serial No. 411,328

12 Claims. (Cl. 236—68)

My invention relates to an improvement in control devices for liquid fuel burners and has for one purpose the provision of a control device which is effective to control the supply of liquid fuel to a liquid fuel burner in response to heat conditions in the space to be heated.

Another purpose is the provision of increased sensitiveness of control.

Another purpose is the provision of control means which automatically adjust the liquid fuel supply to a given heat loss, whereby, unless the heat loss changes, a uniform heat delivery may be maintained.

Another purpose is the provision of sensitive automatic means for automatically varying the fuel supply to the burner in response to changes in heat loss conditions of the space to be heated.

Another purpose is the provision of automatic means for moving the fuel supply control to maximum when heat loss increases, and for thereafter returning it to an adjusted medium flow of fuel, such medium flow of fuel being modulated in response to the changed heat loss conditions of the space to be heated.

Another purpose is the provision of means for returning the control to minimum or pilot flow in response to decreased heat losses and for thereafter modulating the medium or average flow to compensate for a lower heat loss.

Other purposes will appear from time to time in the course of the specification and claims.

I illustrate my invention more or less diagrammatically in the accompanying drawings wherein:

Fig. 3 is a partial view illustrating the controls at high fire position;

Fig. 4 is a view similar to Fig. 3 illustrating the controls at the pilot position.

Like parts are indicated by like symbols throughout the specification and drawings.

Figure 1:
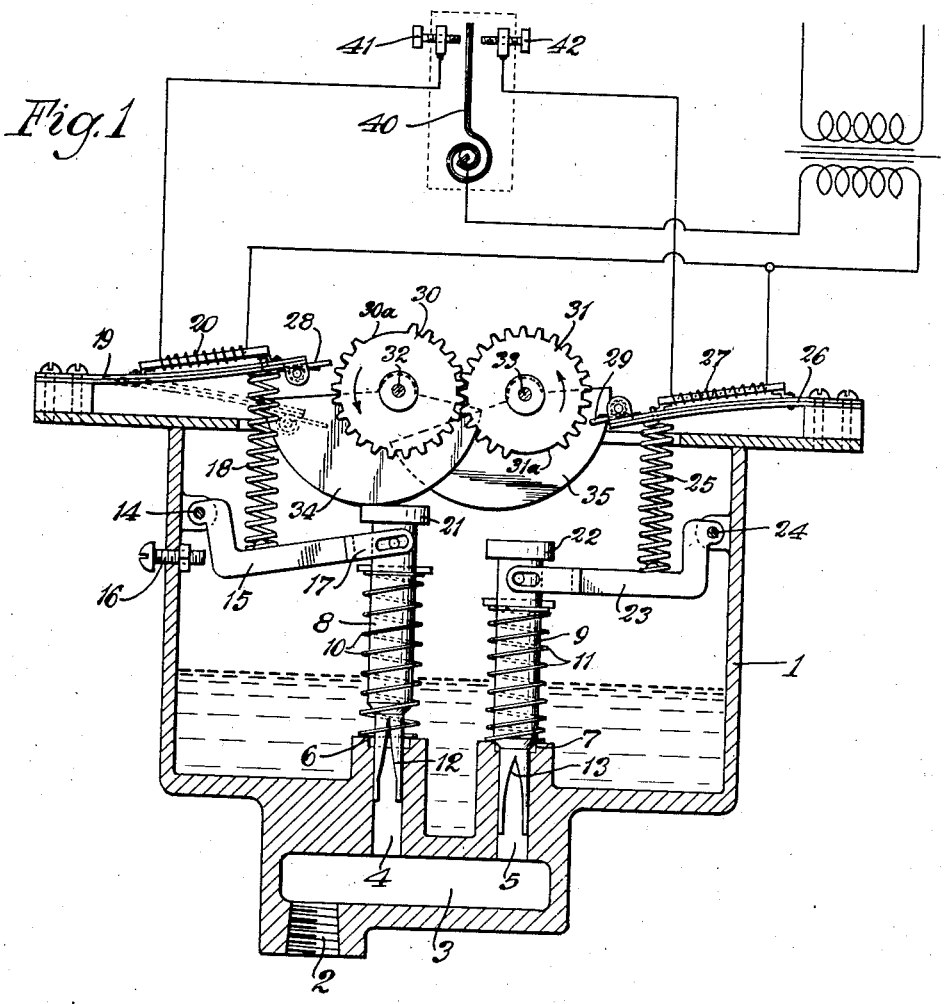
Fig. 1 is a vertical section through the device, with the controls indicated at the intermediate position.
Figure 2:
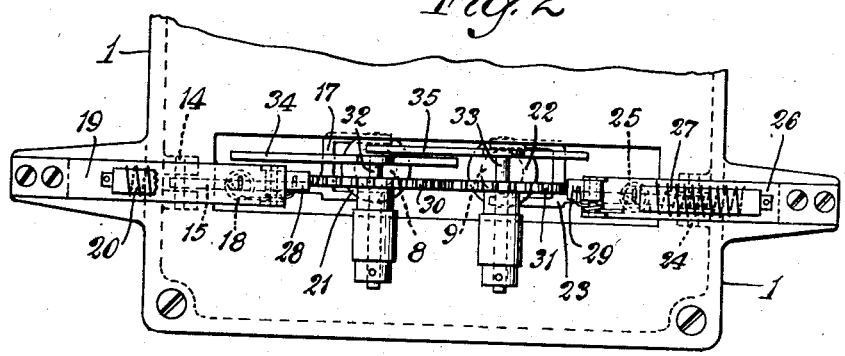
Fig. 2 is a plan view.

Referring to the drawings, I generally indicates a float chamber, the details of which do not of themselves form part of the present invention. It will be understood that any suitable float means not herein shown may be provided for maintaining a predetermined level of fuel in the float chamber. Any suitable means not herein shown may be provided for supplying fuel to the chamber. 2 indicates any suitable oil outlet, which may be connected by any suitable duct, not herein shown, to the burner with which the device is employed. The outlet 2 is in communication with an interior passage 3, which in turn communicates with two outlets 4 and 5, each of which is associated with a valve seat 6 and 7, respectively.

Mounted for cooperation with said valve seats are the valve stems 8 and 9, which are normally urged toward open position by light coil springs 10, 11. The valve members may be provided with any suitable metering slots 12 and 13. It will be observed that the slot 12 of the pilot and medium valve stem is sharper than the slot 13 of the high fire valve stem.

Pivoted to the wall of the housing, as at 14, is an arm 15, the downward movement of which may be adjusted as by the adjusting set screw 16. The arm is provided with a terminal yoke portion 17, which may be pivoted or otherwise secured to the valve stem 8. Any suitable abutment means may be provided for receiving the upper end of the spring 10. It may abut against the yoke if necessary, the point being that the light spring 10 tends to lift the valve stem 8. However, this lifting movement is resisted by the heavy coil spring 18, which is compressed between the arm or yoke 15 and the warping bar 19, secured to the top of the float chamber 1. The warping bar 19 is normally in the upper position in which it is shown in Fig. 1. It is provided with a resistance or heating element 20, the circuit of which will be later described. The upper ends of the valve stems 8 and 9 are provided with top plates or abutments 21, 22, the purpose of which will later appear.

Associated with the stem 9 is a similar lever and yoke, generally indicated as 23, pivoted to the float chamber, as at 24. Opposed to the top of it is the heavy spring 25, which is compressed between the yoke 23 and the warping bar 26 with its resistance 27. The warping bar 26 is normally in the "down" position in which it is shown in Fig. 1. At the ends of the warping bars 19 and 26 are spring urged pawls 28, 29, which are opposed, respectively, to gears 30, 31, pivoted in relation to the housing, as at 32, 33, and in mesh with each other. Moving unitarily with the gears 30 and 31 are the generally arcuate cams 34 and 35, respectively, which have surfaces eccentric in relation to the centers 32 and 33, and which are adapted to oppose the valve stem top abutments 21 and 22 at various times.

40 indicates the central bimetallic member or leaf of a house thermostat, having fixed contacts 41 and 42. When the member 40 flexes to the left, referring to the position of the parts in Fig. 1, it closes a circuit which includes the fixed contact 41 and the resistance 20 of the warping bar 19. The leaf 40 takes this position when the house is overheated, and the result is to close a circuit through the resistance 20, which causes the warping bar 19 to warp down into the dotted line position of Fig. 1 and to compress the heavy spring 18. This position is shown also in Fig. 4. The result is to depress the yoke 15 and thereby to depress the valve stem 8, moving the valve stem 8 to minimum flow or pilot position, as determined by the setting of the pilot fire adjusting screw 16.

It will be understood that the device might be set to cut off altogether, but in the employment of the device herein described and shown I prefer to maintain a pilot flow.

One result of the movement of the warping bar 19 is the engagement of the spring urged pawl 28 with the gear 30, which causes the rotation of the gear 30 in counterclockwise direction, which in return rotates the gear 31 in clockwise direction. In other words, the cam 34 is moved downwardly and the cam 35 is moved upwardly.

When the house becomes cooler as a result of this reduction to the pilot stage, the leaf 40 flexes toward the intermediate position and breaks the circuit through the resistance 20, and the warping bar 19 returns to its top position, and relieves the pressure of the heavy spring 18, in such fashion that the light spring 10 is then effective to raise the valve stem 8 as far as the cam 34 will let it. However, the cam 34 is now one step lower than it previously was, so a step has been made toward adjusting intermediate fire to the heat loss conditions existing in the space to be heated. If too much heat is still delivered, the process will be repeated, and the cam 34 will again be lowered one step, and this will be repeated until finally the setting of the valve stem 8 is correct for maintaining sufficient fuel for heating the space without overheating it. Thus the system modulates itself to any particular heat loss conditions in the space to be heated.

Conversely, if the house is too cold, the bimetal 40 may swing all the way over to contact the fixed contact 42. This closes a circuit through the resistance 27 of the normally downwardly positioned warping bar 26, and the result is that the spring pressed pawl 29 engages the gear 31 and moves it counterclockwise, thus lowering the cam 35, but also releasing the compression of the heavy spring 28, so that the light spring 11 may raise the yoke 23 and the valve stem 9 until the valve stem abutment 22 engages the bottom of the cam 35, as illustrated in Fig. 3. At this stage a substantial flow of oil is permitted through the metering slot 13 of the valve stem 9, this being added to the flow through the slot 12 of the valve stem 8, which of course remains in the raised position.

Meanwhile, the meshing of the gear 31 with the gear 30 has resulted in a clockwise movement of the gear 30 in response to the movement of the warping bar 26, so that the cam 34 is raised a step toward high fire position.

As soon as the combined flow of oil through the metering slots 12 and 13 is sufficient to supply the current demand for heat, the bimetal 40 moves again to the intermediate position, breaking the circuit through the resistance 27 of the warping bar 26 and permitting the warping bar 26 to return to its lower position. It then, by compression of the spring 28, moves the yoke 23 and the valve stem 9 toward closing position. However, it leaves the valve stem 8 in raised position, with its top contact 21 against the cam 34, which, as above mentioned, was raised a step, thereby increasing the intermediate fuel flow. If this is still insufficient to compensate for the heat loss conditions, the bimetal 40 again closes contact with the fixed contact 42 and flexes the warping bar 26 to again release additional fuel through the metering slot 13, and again lift the cam 34 one step. This process is continued until the cam 34 is so set as to supply the fuel at a rate necessary to balance the heat loss conditions of the space to be heated.

It will also be noted that the cam 35 rises as the cam 34 is lowered. However, in any position of the mechanism the total flow of the oil through the metering slots of the two valve stems is that proper for the desired maximum heating effect.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

It is understood, of course, that the motive force supplied by the bimetal members 10 and 26 may also be supplied by metallic means, small motors, and the like.

Stated broadly, my invention includes any means for adjusting upwardly the setting of the intermediate valve control means and the maximum control means in such fashion that, by the employment of some heat responsive means I can increase or diminish the setting of the two valves to compensate for changes in heat loss conditions, and I can so balance or modulate the system that, whenever the heat loss conditions are relatively constant, the fuel flow will automatically be set in such fashion as to meet the heat loss and provide the proper and steady flow of oil for particular heat loss conditions.

Also, it will be understood that I may provide a variety of means or mechanisms to perform the functions above described, namely, for almost immediately increasing the fuel supply to a determined maximum when the house becomes cold, and for almost immediately reducing the fuel supply to a determined minimum when the house becomes overheated.

As an example of a variant application I illustrate in Fig. 5 a device in which the fuel outlet 2 is in communication with a single valve passage 50 controlled by a valve stem 51, with its upper abutment 52, having also a control or stop disc 53, the purpose of which will later appear. The reduced lower end 54 of the valve stem is provided with a metering slot 55. 56 is a spring which normally urges the valve stem toward open position. 57 is any suitable upper stop or abutment therefor, and the lower end of the spring abuts against the boss 58 surrounding the fuel outlet passage 50.

Since a plurality of springs of varying strength are employed, for convenience I will describe the spring 56 as a light spring, in contrast to the medium and heavy springs below described.

In the place of the valve stem 8 shown in Fig. 1, I illustrate a plunger or dummy stem 59, moving with a cylinder 60, and normally urged toward open position as by the medium spring 61. The stem 60 is provided with an abutment head 62. It will be understood that the abutment heads 52 and 62 of the stems 51 and 59 perform the same function as the abutments 22 and 21, respectively, of Fig. 1.

The stem 59 also carries a stop member 63, which moves with it and which underlies the stop disc 53 on the valve stem 51. It will be understood that when the parts are in the position in which they are shown in Fig. 5, the member 63 prevents the valve stem 51 from moving any lower than the position shown in Fig. 5. Since the downward movement of the stem 59 can be adjusted by the stop 16, this permits an adjustment of the minimum or pilot flow position of the valve stem 51.

Figure 5:
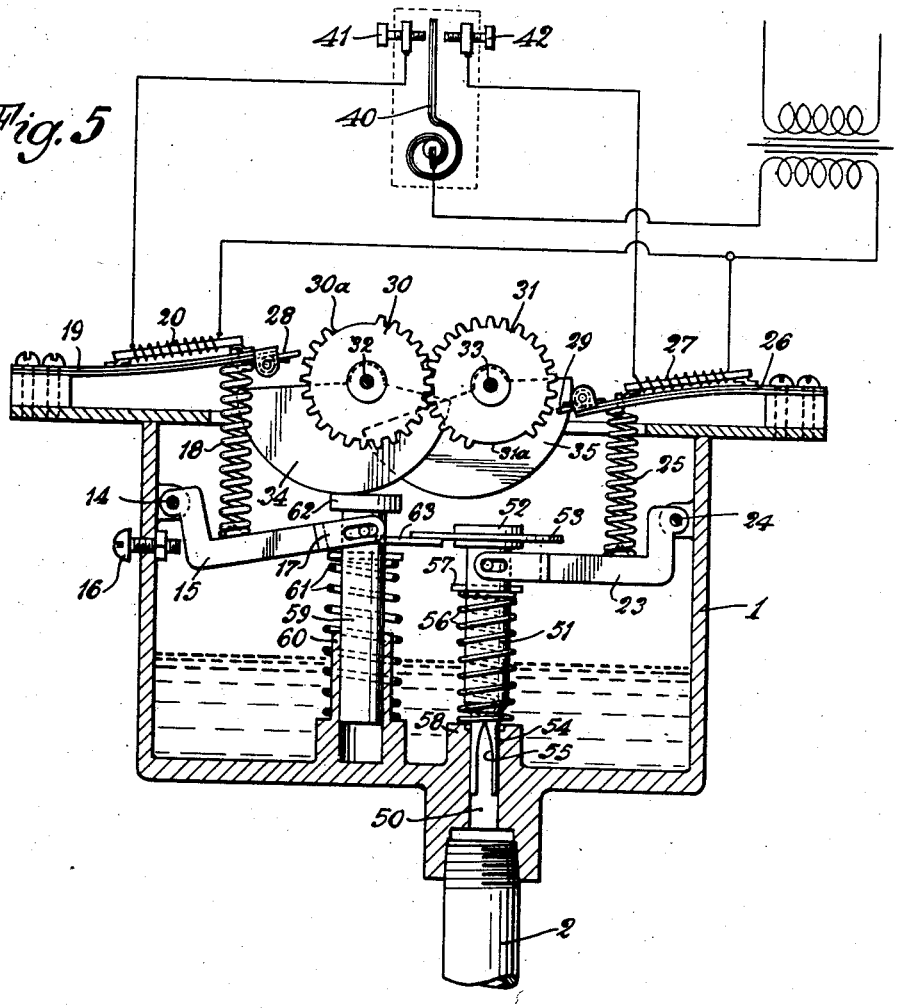
Fig. 5 is a vertical section illustrating a variant form of my invention.

The rest of the structure of Fig. 5 is identical with the structure shown in Fig. 1 and involves the employment of an identical circuit, which will therefore not be separately described in connection with Fig. 5.

It will be understood that the spring 18 is stronger than the spring 61, the spring 61 is stronger than the spring 25, and the spring 56 is weakest of all, as it has to be of lesser strength than the spring 25.

The operation of this form of the device is the same as described in the form of Figs. 1 and following except that the stem 59, instead of directly controlling the flow of fuel through a separate outlet, serves as a stop means through the member 63 for limiting the downward movement of the valve stem 51 toward pilot or minimum flow position. Thus, in the movement of the valve stem 51 the stop 63 serves as a downward stop or limit, the position of which may vary in response to changes in the position of the cam 34, and the cam 35 serves as an upward stop to control the movement of the valve stem 51 towards fully open position, which fully open position is varied or controlled in response to movement of the cam 35. The operation of the cams or their response to temperature changes is the same as that described in connection with Figs. 1 to 4.

The use and operation of my invention are as follows:

I have provided a modulating control mechanism or system, which may be applied to a wide variety of uses, and while I illustrate it as applied to a fuel supply to a liquid hydrocarbon burner, it will be understood that I do not wish to be limited to such use.

I illustrate, as applied for controlling fuel to a hydrocarbon burner, a thermostatically controlled three-stage, self-adjusting fuel control. The three stages are, first, the pilot stage shown in Fig. 4, in which a minimum supply of fuel is delivered; second, an intermediate stage, in which more than a pilot but less than a maximum supply of fuel is permitted to flow, the intermediate stage being shown in Fig. 1; and, third, a high fire stage in which a maximum of fuel is supplied, this stage being shown in Fig. 3.

I illustrate my modulating control as employed with a three-stage thermostat in which a conductive leaf 40 may be at the intermediate position, as shown in Fig. 1, or may engage either one of the two fixed adjustable contacts 41, 42. An important feature of my invention is the fact that, whereas the minimum setting of the two movable valve members 8 and 9 is constant during use, the maximum setting varies as the control operates, so that a cycle of operation may continue until the valve stem 8 which controls the intermediate position or intermediate flow may be raised to a point where it satisfies the thermostat.

Assume that the parts are in the intermediate position, as shown in Fig. 1, with the leaf 40 in intermediate position. If the flow of fuel controlled by the valve stem 8 is proper to maintain the desired temperature, then the leaf 40 remains in its intermediate position, and the control does ont operate. However, if there were somewhat too much fuel flowing and the house overheats, the leaf 40 flexes to the left and closes a circuit through the resistance 20 of the warping bar 19. This causes the warping bar 19 to warp down from its normal full line position of Fig. 1 to the dotted line position in which it is shown in Fig. 1, and as it warps down it moves the gear 30 one step, and thus sets the cam 34 at a slightly lower position. At the same time the spring 18 is compressed, and since it is a heavier spring than the light spring 10, it is effective to move the valve element 8 down to the position in which it is shown in Fig. 4, the downward limit being adjustably controlled by the stop 16. Thus, only a pilot or minimum flow of fuel is possible, and the house cools. After it has cooled to a sufficient degree, the thermostatic leaf 40 warps back into intermediate position, and the intermediate flow continues, although at a slightly lower volume, since the cam 34 has been depressed. If the house still overheats, the process can be repeated until the intermediate flow satisfies the thermostat.

It will be understood also that at each actuation of the warping bar 19, the gear 31 is rotated in a clockwise direction, and thereby the cam 35 which controls the upward limit of movement of the valve 9 is raised. This, however, has no immediate function, since, as long as the intermediate setting of the valve 8 equals or exceeds the demands of the thermostat, the valve 9 is not actuated.

Assume, however, that the supply of fuel which passes the valve element 8 is insufficient for the adequate heating of the house or is insufficient to satisfy the thermostat, if the thermostatic setting is changed, then as the house cools the leaf 40 may swing far enough to the right, referring to the position of the parts in Fig. 1, to contact the adjustable contact element 42. In this event the resistance 27 of the warping bar 26 is heated, and that warping bar moves from its normal bottom position, in which it is shown in Figs. 1 and 4, to its top position, as shown in Fig. 3. The result of this upward movement of the warping bar 26 is to release the yoke 23 and to permit the light spring 11 to lift the valve element 9 as high as the cam 35 will permit. At the same time the gear 31 is moved counterclockwise, slightly reducing the effective height of the cam 35, and the gear 30 is moved clockwise, slightly increasing the height of the cam 34. The result of the excess fuel supply is a heating of the house, which shortly satisfies the thermostat and moves it, say, to the intermediate position in which it is shown in Fig. 1. When that takes place, the warping bar 26 drops back to the position in which it is shown in Fig. 4, without affecting the setting of the cams, and the burner is on the intermediate stage in which it is shown in Fig. 1.

When the house again cools off, the leaf 40 again flexes, and the process is repeated, the two cams in each instance moving one step. Finally, a balance is reached.

It will be understood, of course, that each time that the leaf 40 returns to intermediate position, the valve elements take the position in which they are shown in Fig. 1.

In order to limit the possible movement of the cams, I provide interruptions 30a and 31a in the gear teeth of the gears 30 and 31, respectively. It will be understood that the parts are so proportioned that the gears are always in mesh and the cams and gears always rotate in unison, but the gaps are so proportioned that the rotation of the gears and the setting of the cams is limited.

A further application of my invention is to the modulation of flow through a single valve in which one cam limits the movement of the valve stem controlling such valve, and the other cam, geared thereto, serves as an adjustable stop for limiting the movement of the valve stem towards valve closing position. Otherwise the operation of the device is substantially as above described.

I claim:

1. In combination, a pair of movable valve members, means tending normally to move each said valve member toward open position, a rotatable spiral cam positioned in the line of movement of each said valve member, means for simultaneously rotating said cams in an opposite effective direction whereby the possible opening movement of one of said valve members is increased and the possible opening movement of the other of said valve members is simultaneously decreased, including a direct driving connection between said cams, and thermostatically operable means for rotating said cams.

2. In combination, a pair of movable valve members, means tending normally to move each said valve member toward open position, a rotatable spiral cam positioned in the line of movement of each said valve member, means for simultaneously rotating said cams in an opposite effective direction whereby the possible opening movement of one of said valve members is increased and the possible opening movement of the other of said valve members is simultaneously decreased, including a direct driving connection between said cams, and thermostatically operable means for rotating said cams, including a room thermostat having a flexing member and a pair of separate contacts, and a heat motor having a resistance in circuit with each said contact, and an actuating member associated with each said heat motor and adapted to rotate said cams.

3. In combination, a pair of movable valve members, means tending normally to move each said valve member toward open position, a rotatable spiral cam positioned in the line of movement of each said valve member, means for simultaneously rotating said cams in an opposite effective direction whereby the possible opening movement of one of said valve members is increased and the possible opening movement of the other of said valve members is simultaneously decreased, including a direct driving connection between said cams, and thermostatically operable means for rotating said cams, including a room thermostat having a flexing member and a pair of separate contacts, and a heat motor having a resistance in circuit with each said contact, and an actuating member associated with each said heat motor and adapted to rotate said cams, each said actuating member being adapted to rotate said cams in an opposite direction of rotation.

4. In combination, a pair of movable valve members, means tending normally to move each said valve member toward open position, a rotatable spiral cam positioned in the line of movement of each said valve member, means for simultaneously rotating said cams in an opposite effective direction whereby the possible opening movement of one of said valve members is increased and the possible opening movement of the other of said valve members is simultaneously decreased, including a direct driving connection between said cams, and thermostatically operable means for rotating said cams, including a room thermostat having a flexing member and a pair of separate contacts, and a warping bar having a resistance in circuit with each said contact, and an actuating member associated with each said warping bar and adapted to rotate said cams in an opposite direction of rotation.

5. In a self modulating multiple valve control for the flow of liquids, a liquid source, a pair of valves in communication with said liquid source, each such valve including a movable valve element, means for limiting the closing movement of one of said valve elements to permit a minimum flow of fluid, the other valve element being movable to completely closed position, movable means for variably limiting the opening movement of said first mentioned valve element to a predetermined intermediate flow setting, movable means for variably limiting the opening movement of said second valve element to a maximum flow setting, and separate, temperature responsive means for moving said variably limiting means in unison the first toward opening and the second toward closing position or the second toward opening and the first toward closing position.

6. In a self modulating control for the flow of fluids, a pair of movable control elements, means for guiding said elements along a predetermined path, valve means responsive to the positioning of said movable control elements, and means for simultaneously reducing the possible movement of one of said control elements toward a maximum setting and for increasing the possible movement of the other toward a maximum setting including an actuating connection interposed between said movable control elements and heat responsive means for actuating said actuating connection, said actuating connection being adapted to move said control elements simultaneously in opposite directions.

7. In a self modulating control for the flow of fluids, a pair of movable control elements, means for guiding said elements along a predetermined path, valve means responsive to the positioning of said movable control elements, and means for simultaneously reducing the possible movement of one of said control elements toward a maximum setting and for increasing the possible movement of the other toward a maximum setting, including variable limit means for said movable control elements, yielding means tending normally to urge said control elements toward said limit means, and temperature responsive means for simultaneously moving said limit means in opposite effective directions.

8. In a self modulating control for the flow of fluids, a pair of movable control elements, means for guiding said elements each along a predetermined path, valve means responsive to the positioning of said movable control elements, means for simultaneously reducing the possible movement of one of said control elements toward a maximum setting and for increasing the possible movement of the other of said control elements toward a maximum setting, including a pair of movable abutment members opposed each to one of said movable control elements, a driving connection between said movable abutment members, adapted to cause them to move simultaneously in opposite directions, and heat responsive means for moving said driving connection, and for thereby simultaneously moving said abutment elements in opposite directions.

9. In a self modulating control for the flow of fluids, a pair of movable control elements, means for guiding said elements each along a predetermined path, valve means responsive to the positioning of said movable control elements, means for simultaneously reducing the possible movement of one of said control elements toward a maximum setting and for increasing the possible movement of the other of said control elements toward a maximum setting, including a pair of movable abutment members opposed each to one of said movable control elements, a driving connection between said movable abutment members, adapted to cause them to move simultaneously in opposite directions, and heat responsive means for moving said driving connection, and for thereby simultaneously moving said abutment elements in opposite directions, each said abutment member having a generally spiral surface adapted to contact one of said control elements.

10. In a self modulating control for the flow of fluids, a pair of movable control elements, means for guiding said elements each along a predetermined path, valve means responsive to the positioning of said movable control elements, means for simultaneously reducing the possible movement of one of said control elements toward a maximum setting and for increasing the possible movement of the other of said control elements toward a maximum setting, including a pair of movable abutment members opposed each to one of said movable control elements, a driving connection between said movable abutment members, adapted to cause them to move simultaneously in opposite directions, and heat responsive means for moving said driving connection, and for thereby simultaneously moving said abutment elements in opposite directions, each said abutment member having a generally spiral surface adapted to contact one of said control elements, said abutment members being mounted for rotation about parallel laterally spaced axes.

11. In a self modulating control for the flow of fluids, a pair of movable control elements, means for guiding said elements each along a predetermined path, valve means responsive to the positioning of said movable control elements, means for simultaneously reducing the possible movement of one of said control elements toward a maximum setting and for increasing the possible movement of the other of said control elements toward a maximum setting, including a pair of movable abutment members opposed each to one of said movable control elements, a driving connection between said movable abutment members, adapted to cause them to move simultaneously in opposite directions, and heat responsive means for moving said driving connection, and for thereby simultaneously moving said abutment elements in opposite directions, each said abutment member having a generally spiral surface adapted to contact one of said control elements, said abutment members being mounted for rotation about parallel laterally spaced axes, the driving connection including a pair of meshing gears, having axes common each to one of said movable abutment members.

12. In a self modulating control for the flow of fluids, a pair of movable control elements, means for guiding said elements each along a predetermined path, valve means responsive to the positioning of said movable control elements, means for simultaneously reducing the possible movement of one of said control elements toward a maximum setting and for increasing the possible movement of the other of said control elements toward a maximum setting, including a pair of movable abutment members opposed each to one of said movable control elements, a driving connection between said movable abutment members, adapted to cause them to move simultaneously in opposite directions, and heat responsive means for moving said driving connection, and for thereby simultaneously moving said abutment elements in opposite directions, each said abutment member having a generally spiral surface adapted to contact one of said control elements, said abutment members being mounted for rotation about parallel laterally spaced axes, the driving connection including a pair of meshing gears, having axes common each to one of said movable abutment members, there being a separate heat responsive element adapted to engage and move one of said gears, and means effective to energize said heat responsive elements one at a time.

JAMES L. BREESE.